(12) United States Patent
Roh

(10) Patent No.: US 9,944,819 B1
(45) Date of Patent: Apr. 17, 2018

(54) ECO-FRIENDLY LACQUER COMPOSITIONS AND METHODS FOR PREPARING THE SAME

(71) Applicant: Buyoung Industrial Co., Ltd., Yangsan-si (KR)

(72) Inventor: Gi Young Roh, Yangsan-si (KR)

(73) Assignee: BUYOUNG INDUSTRIAL CO., LTD., Yangsan-si (KR)

( * ) Notice: Subject to any disclaimer, the term of this patent is extended or adjusted under 35 U.S.C. 154(b) by 0 days.

(21) Appl. No.: 15/706,918

(22) Filed: Sep. 18, 2017

(30) Foreign Application Priority Data

Sep. 28, 2016 (KR) .................. 10-2016-0124989

(51) Int. Cl.
| | | |
|---|---|---|
| *C09D 167/08* | (2006.01) | |
| *C09D 7/00* | (2018.01) | |
| *C09D 5/08* | (2006.01) | |
| *C09D 7/12* | (2006.01) | |

(52) U.S. Cl.
CPC ............. *C09D 167/08* (2013.01); *C09D 5/08* (2013.01); *C09D 7/001* (2013.01); *C09D 7/1233* (2013.01); *C09D 7/20* (2018.01); *C09D 7/63* (2018.01)

(58) Field of Classification Search
CPC ........ C09D 167/08; C09D 7/001; C09D 5/08; C09D 7/1233; C09D 7/63; C09D 7/20
See application file for complete search history.

(56) References Cited

U.S. PATENT DOCUMENTS

| | | | | |
|---|---|---|---|---|
| 4,944,964 A | * | 7/1990 | Schmidt ............... | C09D 183/04 427/203 |
| 5,456,747 A | * | 10/1995 | Ibbotson ................ | C09D 7/005 106/245 |
| 9,221,985 B2 | * | 12/2015 | Pasin ..................... | C09D 7/001 |
| 2010/0099806 A1 | | 4/2010 | Houze et al. | |

FOREIGN PATENT DOCUMENTS

| | | | | |
|---|---|---|---|---|
| CN | 103408740 A | * | 11/2013 | ............. C08G 63/49 |
| JP | 2005522558 A | | 7/2005 | |
| KR | 100928140 B1 | | 11/2009 | |

* cited by examiner

*Primary Examiner* — Anthony J Green
(74) *Attorney, Agent, or Firm* — STIP Law Group, LLC

(57) ABSTRACT

An eco-friendly lacquer composition and a method of preparing the eco-friendly lacquer composition are provided. The eco-friendly lacquer composition may include 43% by weight (wt %) to 55 wt % of an acrylic modified alkyd resin including a modified alkyd resin and dimethyl carbonate; 17 wt % to 23 wt % of acetone; and 28 wt % to 34 wt % of tert-butyl acetate, and may be an anti-corrosion lacquer applied onto a surface of a metal.

7 Claims, No Drawings

US 9,944,819 B1

ECO-FRIENDLY LACQUER COMPOSITIONS AND METHODS FOR PREPARING THE SAME

CROSS-REFERENCE TO RELATED APPLICATION

This application claims the benefit of Korean Patent Application No. 10-2016-0124989, filed on Sep. 28, 2016, in the Korean Intellectual Property Office, the disclosure of which is incorporated herein by reference.

BACKGROUND

1. Field of the Invention

At least one example embodiment relates to an eco-friendly lacquer composition and a method of preparing the eco-friendly lacquer composition, and more particularly, to an eco-friendly lacquer composition and a method of preparing the eco-friendly lacquer composition that may minimize a whitening phenomenon and an amount of volatile organic compounds (VOCs) to be emitted and that may be excellent in workability and physical properties.

Moreover, said eco-friendly lacquer composition according to disclosure, gives not only sufficient durability of a surface without pigment but also clear and transparent coated layer without chemical reactivity after drying process.

2. Description of Related Art

Generally, a lacquer is a paint prepared by diluting a resin in a solvent, and a wide variety of resins and solvents are used for lacquer. Lacquer may include, for example, a water resistant spar lacquer that is obtained by heating and bonding a phenolic resin and drying oil as main materials and dissolving the phenolic resin and drying oil in a solvent and that is used for wooden furniture or items inside and outside a building requiring gloss and durability, a water resistant spar lacquer that is obtained by heating and bonding a phenolic resin and modified urethane oil as a main material and dissolving the phenolic resin and modified urethane oil in a solvent and that is used for wooden furniture or items inside and outside a building requiring gloss and durability, and an alkyd resin lacquer that includes an alkyd resin for oxidation and a volatile solvent as main materials and that is used for wooden and steel items inside and outside a building. In an example, a thermoplastic resin, such as polyethylene, may be dissolved in various solvents, and accordingly may be excellent in processability. However, when a solvent is volatilized, the thermoplastic resin may exhibit relatively very low physical properties on a surface of a substrate, which may result in a decrease in a performance as paint.

In another example, a thermosetting resin, such as polysulfonate, may be dissolved only in a solvent with a relatively high performance, and accordingly may have a low processability. However, when the solvent is volatilized, the thermosetting resin may have physical properties capable of relatively effectively protecting a surface of a substrate. As described above in the examples, it is very important to select a solvent suitable for a resin having an excellent processability and capable of protecting a surface of a substrate after a solvent is removed. By selecting the solvent, a whitening phenomenon may be removed, workability and physical properties may be enhanced based on an amount of the selected solvent to be mixed with the resin, and the processability may increase due to a reaction with the resin. Also, pollution caused by pollutants generated while most solvents are volatilized may be prevented.

In other words, since organic compounds (VOCs) as well as toxic materials harmful to human bodies are emitted when most solvents are volatilized in air, toxicity of solvents is enough to deteriorate a working environment and cause environmental issues.

Polar organic solvents may be mainly used to dissolve a resin in a preparation of a lacquer. However, since the above organic solvents are typical carcinogens, a workplace environment may be severely damaged when a prepared lacquer is applied to a work site as well as when a lacquer is prepared.

Korean Patent Laid-Open Publication No. 10-2003-0040069 titled "Method of preparing thermosetting resin varnish" as a related art discloses a lacquer prepared by mixing an aromatic polysulfone resin in a solid form, for example, a powder or pellet, with an aromatic hydrocarbon solvent, for example, toluene or xylene.

Also, Korean Patent Registration No. 10-0928140 titled "Eco-friendly varnish composition and method of preparing the same" discloses a lacquer composition that includes 80 to 150 parts by weight of dimethyl carbonate, and 100 parts by weight of an acrylic modified alkyd resin that includes a modified alkyd resin prepared by a reaction of phthalic anhydride, glycerin, pentaerythritol and soybean fatty acid. However, the lacquer composition is not strongly bonded to a resin and is less eco-friendly even though dimethyl carbonate exempt from VOC regulations is used.

As described above, since solvents necessarily required to prepare a lacquer are mostly carcinogens, the solvents may be very harmful to human bodies. Accordingly, there is a desire for research and development of technologies for improving the above issues.

It is not distinguishable between lacquer and varnish and they have common characteristics such as film formation via solvent evaporation without chemical reaction. The only difference is solvent vaporization rate. For example, the varnish contains rapid evaporation solvent and lacquer contains slow evaporation solvent.

SUMMARY

The present disclosure is to solve the foregoing problems, and an aspect provides an eco-friendly lacquer composition and a method of preparing the eco-friendly lacquer composition that may minimize a whitening phenomenon and an amount of volatile organic compounds (VOCs) to be emitted and that may be excellent in workability and physical properties.

Moreover, said eco-friendly lacquer composition according to disclosure, gives not only sufficient durability of a surface film without pigment but also clear and transparent coated layer without chemical reactivity after drying process.

According to an aspect, there is provided an eco-friendly lacquer composition that includes 43% by weight (wt %) to 55 wt % of an acrylic modified alkyd resin including a modified alkyd resin and dimethyl carbonate, 17 wt % to 23 wt % of acetone, and 28 wt % to 34 wt % of tert-butyl acetate, and that is an anti-corrosion lacquer applied onto a surface of a metal. The modified alkyd resin may be formed by reacting 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate. All the xylene may be recovered when an acid value reaches a value of 4 to 5.

The acrylic modified alkyd resin may be formed by reacting 18 to 25 parts by weight of a modified alkyd resin, 25 to 45 parts by weight of dimethyl carbonate, 10 to 30 parts by weight of styrene, 5 to 15 parts by weight of butyl acrylate, 1 to 10 parts by weight of methyl methacrylate, and 0.5 to 3 parts by weight of benzoyl peroxide.

The modified alkyd resin may include 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate.

According to another aspect, there is provided a method of preparing an eco-friendly lacquer composition, the method including preparing an acrylic modified alkyd resin by reacting a modified alkyd resin and dimethyl carbonate; preparing acetone and tert-butyl acetate; and mixing and stirring 43 wt % to 55 wt % of the acrylic modified alkyd resin, 17 wt % to 23 wt % of the acetone, and 28 wt % to 34 wt % of the tert-butyl acetate.

The preparing of the acrylic modified alkyd resin may include forming the modified alkyd resin.

The forming of the modified alkyd resin may include putting 25 to 35 parts by weight of soybean fatty acid, 1 to 10 parts by weight of glycerin, 15 to 25 parts by weight of phthalic anhydride, and 5 to 15 parts by weight of pentaerythritol into a reactor, performing stirring and nitrogen blowing, and increasing a temperature of the reactor; when the temperature is increased to a temperature of 200° C. to 220° C., putting 0.5 to 2.5 parts by weight of xylene into the reactor, maintaining the temperature of 200° C. to 220° C. while refluxing, and performing a dehydration; and when the temperature is lowered to a temperature of 90° C. to 110° C., putting 35 to 45 parts by weight of dimethyl carbonate into the reactor and controlling a viscosity.

The forming of the modified alkyd resin may further include, between the putting of 0.5 to 2.5 parts by weight of xylene and the putting of 35 to 45 parts by weight of dimethyl carbonate, recovering all the xylene when an acid value reaches a range of 4 to 5.

The preparing method of the acrylic modified alkyd resin may include putting 18 to 25 parts by weight of a modified alkyd resin and 15 to 20 parts by weight of dimethyl carbonate into a reactor, and increasing a temperature of the reactor while stirring; when the temperature is increased to a temperature of 80° C. to 100° C., putting 10 to 30 parts by weight of styrene, 5 to 15 parts by weight of butyl acrylate, 1 to 10 parts by weight of methyl methacrylate, and 1 to 1.5 parts by weight of benzoyl peroxide into the reactor, increasing the temperature to a temperature of 90° C. to 100° C., and maintaining the temperature for a predetermined period of time; when the increasing of the temperature is completed, mixing 0.05 to 0.5 part by weight of benzoyl peroxide and 1 to 2 parts by weight of dimethyl carbonate, dropping a mixture of the benzoyl peroxide and dimethyl carbonate into the reactor a plurality of times, and maintaining the temperature for a predetermined period of time; putting 0.005 to 0.05 part by weight of benzoyl peroxide into the reactor and maintaining the temperature for a predetermined period of time; putting 0.005 to 0.05 part by weight of benzoyl peroxide into the reactor and maintaining the temperature for a predetermined period of time again; putting 5 to 10 parts by weight of dimethyl carbonate into the reactor and performing cooling; and when the temperature is lowered to 80° C. or less, putting 1 to 5 parts by weight of a plasticizer and 1 to 10 parts by weight of dimethyl carbonate into the reactor and reacting the plasticizer and dimethyl carbonate.

Moreover, said preparing method of the acrylic modified alkyd resin may not include the step of using extender pigments nor color pigments for color and/or gloss after reaction.

The preparing of the acrylic modified alkyd resin may include forming the modified alkyd resin. The forming of the modified alkyd resin may include putting 25 to 35 parts by weight of soybean fatty acid, 1 to 10 parts by weight of glycerin, 15 to 25 parts by weight of phthalic anhydride, and 5 to 15 parts by weight of pentaerythritol into a reactor, performing stirring and nitrogen blowing, and increasing a temperature of the reactor; when the temperature is increased to a temperature of 200° C. to 220° C., putting 0.5 to 2.5 parts by weight of xylene into the reactor, maintaining the temperature of 200° C. to 220° C. while refluxing, and performing a dehydration; and when the temperature is lowered to a temperature of 90° C. to 110° C., putting 35 to 45 parts by weight of dimethyl carbonate into the reactor and controlling a viscosity.

The forming of the modified alkyd resin may further include, between the putting of 0.5 to 2.5 parts by weight of xylene and the putting of 35 to 45 parts by weight of dimethyl carbonate, recovering all the xylene when an acid value reaches a range of 4 to 5.

Additional aspects of example embodiments will be set forth in part in the description which follows and, in part, will be apparent from the description, or may be learned by practice of the disclosure.

DETAILED DESCRIPTION

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

Example embodiments provide a lacquer and a method of preparing the lacquer. The lacquer may be used to optimize physical properties desired by an end user, for example, a non-volatility of a solid, a viscosity, a specific gravity, a film thickness, a water mixability, and the like, to maintain a drying rate and workability, for example, a prevention of a film whitening phenomenon, and the like, to achieve environment/health hygiene using all materials that are exempt from volatile organic compound (VOC) regulations, and to be exempted from an obligation to install air pollution prevention facilities.

The lacquer may be an anti-corrosion lacquer that may be applied to a steel pipe and used to prevent a corrosion caused by, for example, sea salt during a marine transportation for export of steel pipes and used to prevent a corrosion of steel pipes used to develop shale gas and oil.

Hereinafter, the example embodiments will be described in detail with reference to the accompanying drawings.

According to an example embodiment, an eco-friendly lacquer composition may include 43% by weight (wt %) to 55 wt % of an acrylic modified alkyd resin, 17 wt % to 23 wt % of acetone, and 28 wt % to 34 wt % of tert-butyl acetate. The acrylic modified alkyd resin may include a modified alkyd resin and dimethyl carbonate.

The dimethyl carbonate may desirably be included in an amount of 20 wt % to 26 wt % in the acrylic modified alkyd resin based on a total amount of the eco-friendly lacquer composition.

The modified alkyd resin may include 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate.

The soybean fatty acid may be used to induce a modification of an alkyd resin, and may desirably be included in an amount of 25 to 35 parts by weight, more desirably in an amount of 29.96 parts by weight. When the amount of the soybean fatty acid is less than 25 parts by weight, it may be difficult to induce the modification of the alkyd resin. When the amount of the soybean fatty acid exceeds 35 parts by weight, the alkyd resin may be excessively modified.

The glycerin (94%), as polyhydric alcohol, may be used as a raw material of an alkyd resin. To satisfy physical properties of the modified alkyd resin, glycerin may desirably be added in an amount of 1 to 10 parts by weight, more desirably in an amount of 6.04 parts by weight.

The phthalic anhydride, as polyhydric acid, may be used as a raw material of an alkyd resin, similarly to the glycerin. To satisfy physical properties of the modified alkyd resin similarly to the glycerin, the phthalic anhydride desirably be added in an amount of 15 to 25 parts by weight, more desirably in an amount of 18.86 parts by weight.

The pentaerythritol (95%), as polyhydric alcohol, may function as a stabilizer to stabilize an alkyd resin. When the amount of the pentaerythritol is less than 5 parts by weight, the pentaerythritol may be insufficient to stabilize physical properties of the modified alkyd. When the amount of the pentaerythritol exceeds 15 parts by weight, the pentaerythritol may not be more effective to stabilize physical properties of the modified alkyd resin, in comparison to when pentaerythritol is added in an amount of 15 parts by weight or less. Thus, the pentaerythritol may desirably be added in an amount of 5 to 15 parts by weight, more desirably in an amount of 9.72 parts by weight.

The xylene may be a solvent added for a reflux to smoothly react with a resin and to smoothly remove water (for example, condensate) produced during a reaction. All of the xylene may desirably be recovered by vacuumizing a reactor, because the xylene does not need to be used when a reaction ends, although the xylene is subject to the VOC regulations. Desirably, the xylene may be initially added in an amount of 0.5 to 2.5 parts by weight, more desirably in an amount of 1.93 parts by weight, based on a 100% recovery rate.

The dimethyl carbonate may be used as a diluent to control a viscosity of the modified alkyd resin, and may be exempt from the VOC regulations. The dimethyl carbonate may be used to replace a toluene solvent in a composition of an existing product by a material that is exempt from the VOC regulations. In particular, since a solubility of the dimethyl carbonate is superior to that of acetone or tert-butyl acetate that is exempt from the VOC regulations, the dimethyl carbonate may desirably be added in an amount of 35 to 45 parts by weight, more desirably in an amount of 40 parts by weight, in a primary reaction to prepare the modified alkyd resin, based on the solubility. When the amount of dimethyl carbonate is less than 35 parts by weight, the dimethyl carbonate may be insufficient to control the viscosity of the modified alkyd resin. When the amount of dimethyl carbonate exceeds 45 parts by weight, it may be difficult to control the viscosity of the modified alkyd resin in comparison to when the dimethyl carbonate is added in an amount of 45 parts by weight or less.

The acrylic modified alkyd resin may be obtained through a secondary reaction, and may be a copolymer obtained by synthesizing 18 to 25 parts by weight of a modified alkyd resin, 25 to 45 parts by weight of dimethyl carbonate, 10 to 30 parts by weight of styrene, 5 to 15 parts by weight of butyl acrylate, 1 to 10 parts by weight of methyl methacrylate and 0.5 to 3 parts by weight of benzoyl peroxide.

The modified alkyd resin may be a base of the acrylic modified alkyd resin, and may include 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate, as described above. The modified alkyd resin may desirably be included in an amount of 18 to 25 parts by weight, more desirably in an amount of 21.92 parts by weight, based on a blending rate of the modified alkyd resin with the other components.

The dimethyl carbonate may be used as a solvent of the acrylic modified alkyd resin, to dilute and smoothly dissolve the acrylic modified alkyd resin. When the amount of dimethyl carbonate is less than 25 parts by weight, the dimethyl carbonate may be insufficient to dilute the acrylic modified alkyd resin. When the amount of dimethyl carbonate exceeds 45 parts by weight, a large amount of the other components corresponding to the amount of dimethyl carbonate may need to be added due to an extremely large amount of dimethyl carbonate. Thus, the dimethyl carbonate may desirably be added in an amount of 25 to 45 parts by weight.

The styrene may be an intermediate raw material (for example, a monomer) used for production of a polymer synthetic product. The styrene is one of 35 types of materials subject to the VOC regulations, however, may change to a polymer in a polymerization. Accordingly, a VOC may not be included in a final synthetic resin. Based on a reactivity in the polymerization, the styrene may desirably be added in an amount of 10 to 30 parts by weight, more desirably in an amount of 24.72 parts by weight.

The butyl acrylate (BA) may be a monomer used for paint adhesion and synthesis. Similarly to the styrene, the butyl acrylate is one of 35 types of materials subject to the VOC regulations, however, may change to a polymer in a polymerization. Accordingly, a VOC may not be included in a final synthetic resin. Based on a reactivity, the butyl acrylate may desirably be added in an amount of 5 to 15 parts by weight, more desirably in an amount of 8.98 parts by weight.

The methyl methacrylate (MMA) may be a monomer used for an acrylic synthesis. Similarly to the above-described styrene and butyl acrylate, the methyl methacrylate is one of 35 types of materials subject to the VOC regulations, however, may change to a polymer in a polymerization. Accordingly, a VOC may not be included in a final synthetic resin. Based on a reactivity, the methyl methacrylate may desirably be added in an amount of 1 to 10 parts by weight, more desirably in an amount of 5.61 parts by weight.

The benzoyl peroxide (BPO 98%) may be a synthesis initiator for a viscosity of the acrylic modified alkyd resin, and may desirably be added in an amount of 0.5 to 3 parts by weight. When the amount of benzoyl peroxide is less than 0.5 parts by weight, it may be difficult to assign a viscosity to the acrylic modified alkyd resin. When the amount of benzoyl peroxide exceeds 3 parts by weight, physical properties of the acrylic modified alkyd resin may be changed. Thus, the benzoyl peroxide may desirably be added in the amount of 3 parts by weight.

The eco-friendly lacquer composition may include 43 wt % to 55 wt % of acrylic modified alkyd resin, 17 wt % to 23 wt % of acetone, and 28 wt % to 34 wt % of tert-butyl acetate. The acrylic modified alkyd resin may include a modified alkyd resin and dimethyl carbonate.

The dimethyl carbonate may desirably be included in an amount of 20 wt % to 26 wt % in the acrylic modified alkyd resin based on a total amount of the eco-friendly lacquer composition. Three types of diluents, for example, dimethyl carbonate, acetone and tert-butyl acetate, may be eco-friendly diluents, and may be exempt from VOC regulations published in a national institute of environmental research (NIER).

The above-described acrylic modified alkyd resin may be used, and may desirably be added in an amount of 43 wt % to 55 wt % to maximize physical properties of an eco-friendly lacquer. When the amount of acrylic modified alkyd resin is less than 43 wt %, it may be difficult to properly perform a function of the eco-friendly lacquer composition. When the amount of acrylic modified alkyd resin exceeds 55 wt %, an amount of acetone and tert-butyl acetate to be added may decrease. Thus, the acrylic modified alkyd resin may desirably be added in the amount of 43 wt % to 55 wt %.

The dimethyl carbonate may be a solvent, may be added in the amount of 20 wt % to 26 wt % based on the total amount of the eco-friendly lacquer composition to maximize a function of a solvent, and may be exempt from the VOC regulations. When the amount of dimethyl carbonate is less than 20 wt %, it may be difficult to dissolve the other components of the eco-friendly lacquer composition. When the amount of dimethyl carbonate exceeds 26 wt %, amounts of the other components to be added may decrease, which may lead to poor physical properties of a final eco-friendly lacquer composition. Thus, the dimethyl carbonate may desirably be added in the amount of 20 wt % to 26 wt %.

The acetone may be used as a solvent to dilute and bond a resin and may be exempt from the VOC regulations. To enhance a binding capacity of a resin, the acetone may desirably be added in an amount of 17 wt % to 23 wt %.

The tert-butyl acetate (T-BA) may also be used as a solvent to dilute and bond a resin and may be exempt from the VOC regulations. To sufficiently perform a function of diluting and bonding a resin, the tert-butyl acetate may desirably added in an amount of 28 wt % to 34 wt %.

Hereinafter, a method of preparing a modified alkyd resin, an acrylic modified alkyd resin, and an eco-friendly lacquer composition will be described in detail.

1) Preparation of Modified alkyd Resin 25 to 35 parts by weight of soybean fatty acid, 1 to 10 parts by weight of glycerin, 15 to 25 parts by weight of phthalic anhydride and 5 to 15 parts by weight of pentaerythritol may be put into a reactor and stirring and nitrogen blowing may be simultaneously performed to increase a temperature of the reactor.

When the temperature is increased to a temperature of 200° C. to 220° C., 0.5 to 2.5 parts by weight of xylene may be put into the reactor, the temperature of 200° C. to 220° C. may be maintained while refluxing, and a dehydration may be performed.

For example, when the temperature is increased to 210° C., the xylene may be put into the reactor, the temperature may be maintained at 210° C. while refluxing, and the dehydration may be performed. The xylene may be a solvent added for a reflux to smoothly react with a resin and to smoothly remove water (for example, condensate) produced during a reaction. All of the xylene may be recovered by vacuumizing the reactor, because the xylene does not need to be used when the reaction ends.

When an acid value reaches a range of 4 to 5, the xylene may terminate a reaction, and all of the xylene may be recovered. For example, when 1.93 parts by weight of xylene is added, 1.93 parts by weight of the xylene may be recovered. 35 to 45 parts by weight of dimethyl carbonate may be put into the reactor, and a viscosity may be controlled.

For example, when a reaction is terminated and when the temperature is lowered to a of 90° C. to 110° C. (for example, less than 100° C.), the viscosity may be controlled, and dimethyl carbonate for a dilution may be put into the reactor and a standard may be controlled, to complete preparation of the modified alkyd resin.

The dimethyl carbonate may be used as a solvent for dilution and for controlling the viscosity, and may be exempt from the VOC regulations. The dimethyl carbonate may have a greatest solubility among materials exempt from the VOC regulations, and accordingly may be added in a primary reaction to prepare the modified alkyd resin.

2) Preparation of acrylic Modified alkyd Resin 18 to 25 parts by weight of a modified alkyd resin and 15 to 20 parts by weight of dimethyl carbonate may be put once or twice into a reactor, stirring may be performed and a temperature of the reactor may be increased.

When the temperature is increased to a temperature of 80° C. to 100° C., 10 to 30 parts by weight of styrene, 5 to 15 parts by weight of butyl acrylate, 1 to 10 parts by weight of methyl methacrylate and 1 to 1.5 parts by weight of benzoyl peroxide may be put into the reactor, and the temperature may be increased to a temperature of 90° C. to 100° C. and maintained for a predetermined period of time.

For example, when the temperature reaches 90° C., a monomer (for example, styrene, butyl acrylate and methyl methacrylate) may be uniformly mixed with a synthesis initiator (for example, benzoyl peroxide) for increasing the viscosity, to obtain a mixture. The mixture may be dropped into the reactor for 3 hours, and the temperature may be gradually increased to 95° C. and maintained for 1 hour.

Also, although the styrene, the butyl acrylate and the methyl methacrylate are subject to the VOC regulations, the styrene, the butyl acrylate and the methyl methacrylate may change to polymers in a polymerization. Thus, a VOC may not be included in an eco-friendly lacquer composition.

When the increasing of the temperature is completed, 0.05 to 0.5 part by weight of benzoyl peroxide and 1 to 2 parts by weight of dimethyl carbonate may be mixed, a mixture of the benzoyl peroxide and dimethyl carbonate may be dropped into the reactor a plurality of times, and the temperature may be maintained for a predetermined period of time.

To obtain an accurate viscosity and to smoothly performing a dissolving operation, when the temperature is maintained for 1 hour, a small amount of benzoyl peroxide and a small amount of dimethyl carbonate may be uniformly mixed at an interval of 10 minutes, and a mixture of the benzoyl peroxide and dimethyl carbonate may be dropped into the reactor four times in total, followed by maintaining the temperature for 1 hour and 30 minutes.

0.005 to 0.05 part by weight of benzoyl peroxide may be put once into the reactor and the temperature may be maintained for a predetermined period of time. When the temperature is maintained for 1 hour and 30 minutes, a small amount of benzoyl peroxide used as a synthesis initiator to reach a standard value of a viscosity may be added, and the temperature may be maintained for 1 hour and 30 minutes again.

0.005 to 0.05 part by weight of benzoyl peroxide may be further put once into the reactor and the temperature may be maintained for a predetermined period of time again. When the temperature is maintained for 1 hour and 30 minutes again, a small amount of benzoyl peroxide may be further added and the temperature may be maintained for 1 hour and 30 minutes again.

5 to 10 parts by weight of dimethyl carbonate may be put once into the reactor and cooling may be performed. For example, when 2 hours have elapsed for a dilution and cooling, dimethyl carbonate may be put and cooling may be performed.

When the cooling is performed, that is, when the temperature is lowered to 80° C. or less, 1 to 5 parts by weight (more desirably 2.73 parts by weight) of a plasticizer and 1 to 10 parts by weight (more desirably 6.9 parts by weight) of dimethyl carbonate may be put into the reactor and may react with each other.

For example, when the temperature is lowered to 80° C. or less, a NEO-T as a plasticizer used to smoothly mix a monomer and a solvent, and dimethyl carbonate as a solvent to dilute a resin may be put into the reactor, a standard may be controlled, and a reaction may be terminated, to complete preparation of the acrylic modified alkyd resin.

After said reaction, it is not needed to additional step of using extender pigments nor color pigments for color and/or gloss after reaction.

3) Preparation of Eco-friendly Lacquer Composition

An acrylic modified alkyd resin including a modified alkyd resin and dimethyl carbonate may be prepared.

The acrylic modified alkyd resin has been fully described above, and accordingly further description is omitted here.

Acetone and tert-butyl acetate may be prepared.

The dimethyl carbonate, the acetone and the tert-butyl acetate may be eco-friendly diluents and may be exempt from the VOC regulations published in the NIER, which have been fully described above, and accordingly further description is omitted here.

43 wt % to 55 wt % of an acrylic modified alkyd resin (including 20 wt % to 26 wt % of dimethyl carbonate), 17 wt % to 23 wt % of acetone and 28 wt % to 34 wt % of tert-butyl acetate may be mixed and stirred.

43 wt % to 55 wt % (more desirably 49 wt %) of the acrylic modified alkyd resin, 17 wt % to 23 wt % (more desirably 20 wt %) of the acetone and 28 wt % to 34 wt % (more desirably 31 wt %) of the tert-butyl acetate may be put into a reactor and mixing and stirring may be performed, to acquire an eco-friendly lacquer composition.

Experimental results associated with amounts of VOCs detected from a lacquer according to an example embodiment in comparison to a lacquer according to a related art are shown in Table 1 below.

TABLE 1

| Product | Place of experiment | Experimental method | Amount of VOCs detected |
|---|---|---|---|
| Lacquer (BY VN-600) (KR Pat. No. 10-0928140) | Korea Conformity Laboratories | KS M ISO 11890-2: 2007 | 181.25 g/L |
| Lacquer according to example embodiment | Pukyong National University Industry-University Cooperation Foundation | KS M ISO 11890-2: 2007 | 4.98 g/L |

As shown in Table 1, a relatively large amount of VOCs, that is, 181.25 g/L was detected from the lacquer according to the related art, whereas a relatively small amount of VOCs, that is, 4.98 g/L was detected from the lacquer according to an example embodiment. Thus, the lacquer according to an example embodiment was proved to be eco friendly due to a small amount of VOCs detected.

As described above, according to example embodiments, it is possible to prepare an ultra-fast natural drying anti-corrosion lacquer that may prevent a corrosion of a steel pipe for export (for example, a white pipe or black pipe), steel, and the like, by minimizing a whitening phenomenon based on a climate change, by enhancing physical properties and workability and by strengthening eco-friendly properties, in comparison to the lacquer BY VN-600 (KR Pat. No. 10-0928140).

In particular, since solvents used in the example embodiments are exempt from VOC regulations designated and notified under Article 3, Article 2 (10) of the Clean Air Conservation Act, the solvents have negligible photochemical ozone generating abilities and little harm to humans and environments. Accordingly, the solvents may have a technical necessity and substitution effect for eco-friendly paints, and may be used as raw materials capable of improving a working environment, a safe and health of a worker and an air pollution, to allow an exemption from an obligation to install air pollution prevention facilities.

According to an example embodiment, an eco-friendly lacquer composition and a method of preparing the eco-friendly lacquer composition are provided. The eco-friendly lacquer composition may include 43 wt % to 55 wt % of an acrylic modified alkyd resin including a modified alkyd resin and dimethyl carbonate, 17 wt % to 23 wt % of acetone, and 28 wt % to 34 wt % of tert-butyl acetate, and may be an anti-corrosion lacquer applied onto a surface of a metal. The modified alkyd resin may be formed by reacting 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate. All the xylene may be recovered when an acid value reaches a value of 4 to 5.

Although a few example embodiments of the present disclosure have been shown and described, the present disclosure is not limited to the described example embodiments. Instead, it would be appreciated by those skilled in the art that changes may be made to these example embodiments without departing from the principles and spirit of the present disclosure, the scope of which is defined by the claims and their equivalents.

What is claimed is:

1. An eco-friendly lacquer composition comprising:
    43% by weight (wt %) to 55 wt % of an acrylic modified alkyd resin comprising a modified alkyd resin and dimethyl carbonate;
    17 wt % to 23 wt % of acetone; and
    28 wt % to 34 wt % of tert-butyl acetate,
    wherein the eco-friendly lacquer composition is an anticorrosion lacquer applied onto a surface of a metal.

2. The eco-friendly lacquer composition of claim 1, wherein the acrylic modified alkyd resin is formed by reacting 18 to 25 parts by weight of a modified alkyd resin, 25 to 45 parts by weight of dimethyl carbonate, 10 to 30 parts by weight of styrene, 5 to 15 parts by weight of butyl acrylate, 1 to 10 parts by weight of methyl methacrylate, and 0.5 to 3 parts by weight of benzoyl peroxide.

3. The eco-friendly lacquer composition of claim 1, wherein the modified alkyd resin comprises 25 to 35 parts by weight of soybean fatty acid, 1 to 10 parts by weight of glycerin, 15 to 25 parts by weight of phthalic anhydride, 5 to 15 parts by weight of pentaerythritol, 0.5 to 2.5 parts by weight of xylene and 35 to 45 parts by weight of dimethyl carbonate.

4. A method of preparing an eco-friendly lacquer composition, the method comprising:
    preparing an acrylic modified alkyd resin by reacting a modified alkyd resin and dimethyl carbonate;
    preparing acetone and tert-butyl acetate; and
    mixing and stirring 43% by weight (wt %) to 55 wt % of the acrylic modified alkyd resin, 17 wt % to 23 wt % of the acetone, and 28 wt % to 34 wt % of the tert-butyl acetate.

5. The method of claim 4, wherein the preparing of the acrylic modified alkyd resin comprises:
    putting 18 to 25 parts by weight of a modified alkyd resin and 15 to 20 parts by weight of dimethyl carbonate into a reactor, and increasing a temperature of the reactor while stirring;
    when the temperature is increased to a temperature of 80° C. to 100° C., putting 10 to 30 parts by weight of styrene, 5 to 15 parts by weight of butyl acrylate, 1 to 10 parts by weight of methyl methacrylate, and 1 to 1.5 parts by weight of benzoyl peroxide into the reactor, and increasing the temperature to a temperature of 90° C. to 100° C.;
    when the increasing of the temperature is completed, mixing 0.05 to 0.5 part by weight of benzoyl peroxide and 1 to 2 parts by weight of dimethyl carbonate, and dropping a mixture of the benzoyl peroxide and dimethyl carbonate into the reactor a plurality of times;
    putting 0.005 to 0.05 part by weight of benzoyl peroxide into the reactor;
    putting 0.005 to 0.05 part by weight of benzoyl peroxide into the reactor;
    putting 5 to 10 parts by weight of dimethyl carbonate into the reactor and performing cooling; and
    when the temperature is lowered to 80° C. or less, putting 1 to 5 parts by weight of a plasticizer and 1 to 10 parts by weight of dimethyl carbonate into the reactor and reacting the plasticizer and dimethyl carbonate.

6. The method of claim 4, wherein the preparing of the acrylic modified alkyd resin comprises forming the modified alkyd resin,
    wherein the forming of the modified alkyd resin comprises:
    putting 25 to 35 parts by weight of soybean fatty acid, 1 to 10 parts by weight of glycerin, 15 to 25 parts by weight of phthalic anhydride, and 5 to 15 parts by weight of pentaerythritol into a reactor, performing stirring and nitrogen blowing, and increasing a temperature of the reactor;
    when the temperature is increased to a temperature of 200° C. to 220° C., putting 0.5 to 2.5 parts by weight of xylene into the reactor, maintaining the temperature of 200° C. to 220° C. while refluxing, and performing a dehydration; and
    when the temperature is lowered to a temperature of 90° C. to 110° C., putting 35 to 45 parts by weight of dimethyl carbonate into the reactor and controlling a viscosity.

7. The method of claim 6, wherein the forming of the modified alkyd resin further comprises, between the putting of 0.5 to 2.5 parts by weight of xylene and the putting of 35 to 45 parts by weight of dimethyl carbonate, recovering all the xylene when an acid value reaches a range of 4 to 5.

* * * * *